US007914410B2

(12) United States Patent
Oishi et al.

(10) Patent No.: US 7,914,410 B2
(45) Date of Patent: Mar. 29, 2011

(54) BICYCLE CHAIN CONNECTING LINK

(75) Inventors: Toshinari Oishi, Sakai (JP); Kenji Kamada, Sakai (JP)

(73) Assignee: Shimano Inc., Osaka (JP)

( * ) Notice: Subject to any disclaimer, the term of this patent is extended or adjusted under 35 U.S.C. 154(b) by 906 days.

(21) Appl. No.: 11/529,330

(22) Filed: Sep. 29, 2006

(65) Prior Publication Data

US 2008/0081720 A1 Apr. 3, 2008

(51) Int. Cl.
*F16G 13/02* (2006.01)

(52) U.S. Cl. ........ 474/227; 474/220; 474/223; 474/224; 474/228; 474/230; 474/231; 59/4; 59/5; 59/78; 59/84

(58) Field of Classification Search .......... 474/202–237; 59/3, 5, 7, 11, 14; *F16G 13/00, 13/02, 13/06, F16G 13/07, 15/00, 15/12*
See application file for complete search history.

(56) References Cited

U.S. PATENT DOCUMENTS

| | | | | | |
|---|---|---|---|---|---|
| 237,771 | A * | 2/1881 | Paine | 474/227 |
| 610,751 | A * | 9/1898 | Wood | 474/227 |
| 818,469 | A * | 4/1906 | Rogers | 474/227 |
| 1,453,088 | A * | 4/1923 | Bachman et al. | 474/227 |
| 1,589,201 | A * | 6/1926 | Meier | 474/227 |
| 4,202,219 | A | 5/1980 | Weis | |
| 4,863,418 | A * | 9/1989 | Fillar et al. | 474/207 |
| 5,178,585 | A | 1/1993 | Lin et al. | |
| 5,186,569 | A | 2/1993 | Wu | |
| 5,362,282 | A | 11/1994 | Lickton | |
| 5,461,852 | A * | 10/1995 | Nagamatsu | 59/84 |
| 6,110,064 | A | 8/2000 | Guichard | |
| 2002/0173395 | A1* | 11/2002 | Reiter et al. | 474/231 |
| 2007/0197333 | A1* | 8/2007 | Santos | 474/227 |

FOREIGN PATENT DOCUMENTS

| | | | |
|---|---|---|---|
| CN | 2132032 | Y | 5/1993 |
| DE | G 93 10 853.2 | | 11/1993 |

* cited by examiner

*Primary Examiner* — Robert A Siconolfi
*Assistant Examiner* — San Aung
(74) *Attorney, Agent, or Firm* — Global IP Counselors, LLP

(57) ABSTRACT

A bicycle chain connecting link basically has a first link plate, a second link plate, a first link pin and a second link pin. The first link plate has a longitudinal slot. The second link plate has a pair of pin attachment openings. The first and second link pins each have a first pin end retained to the first link plate and a second pin end releasably coupled in the pin attachment openings of the second link plate to be separated from the second link plate and reattached to the second link plate. At least one of the first pin ends of the first and second link pins is slidable within the longitudinal slot of the first link plate in a longitudinal direction of the longitudinal slot of the first link plate.

22 Claims, 16 Drawing Sheets

BICYCLE CHAIN CONNECTING LINK

BACKGROUND OF THE INVENTION

1. Field of the Invention

This invention generally relates to a bicycle chain connecting link, which is often called a master chain link. More specifically, the present invention relates to a bicycle chain connecting link that is relatively easy to assemble and disassemble without the need of special tools.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been redesigned is the bicycle chain.

Most bicycles have a drive train that uses a chain to transmit the pedaling action from the rider to the rear wheel. Bicycle chains have a plurality of inner links and a plurality of outer links that are interconnected in an alternating manner by a plurality of pins. Typically, each of the inner links includes a pair of parallel inner plates connected by a pair of parallel hollow cylinders or pins surrounded by cylindrical rollers. Each of the outer pin links includes a pair of parallel outer plates connected by the pins of the adjacent inner links. In order to form a single continuous chain, two of the inner links are connected together by a releasable connecting link, which is often called a master chain link. Thus, the master link forms a special outer pin link that is configured to permit assemble and disassemble of the two of the inner links of the bicycle chain so that the bicycle chain can be removed from the bicycle. Examples of bicycle chains with a master link are disclosed in U.S. Pat. No. 5,362,282 to Lickton, U.S. Pat. No. 6,110,064 to Guichard, and U.S. Patent Publication No. 2002/0173395A1 to Reiter et al.

While these above-mentioned master links work well, it will be apparent to those skilled in the art from this disclosure that there exists a continual need for a master chain link that is easy to assemble and disassemble without the need of special tools. This invention addresses this need in the art as well as other needs, which will become apparent to those skilled in the art from this disclosure.

SUMMARY OF THE INVENTION

One object of the present invention is to provide a master chain link that is relatively easy to assemble and disassemble without the need of special tools.

The foregoing objects can basically be attained by providing a bicycle chain connecting link that basically comprises a first link plate, a second link plate, a first link pin and a second link pin. The first link plate includes a longitudinal slot. The second link plate includes a first pin attachment opening and a second pin attachment opening. The first link pin includes a first pin end retained to the first link plate and a second pin end releasably coupled in the first pin attachment opening of the second link plate to be separated from the second link plate and reattached to the second link plate. The second link pin includes a first pin end slidably retained in the longitudinal slot of the first link plate and a second pin end releasably coupled in the second pin attachment opening of the second link plate to be separated from the second link plate and reattached to the second link plate.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
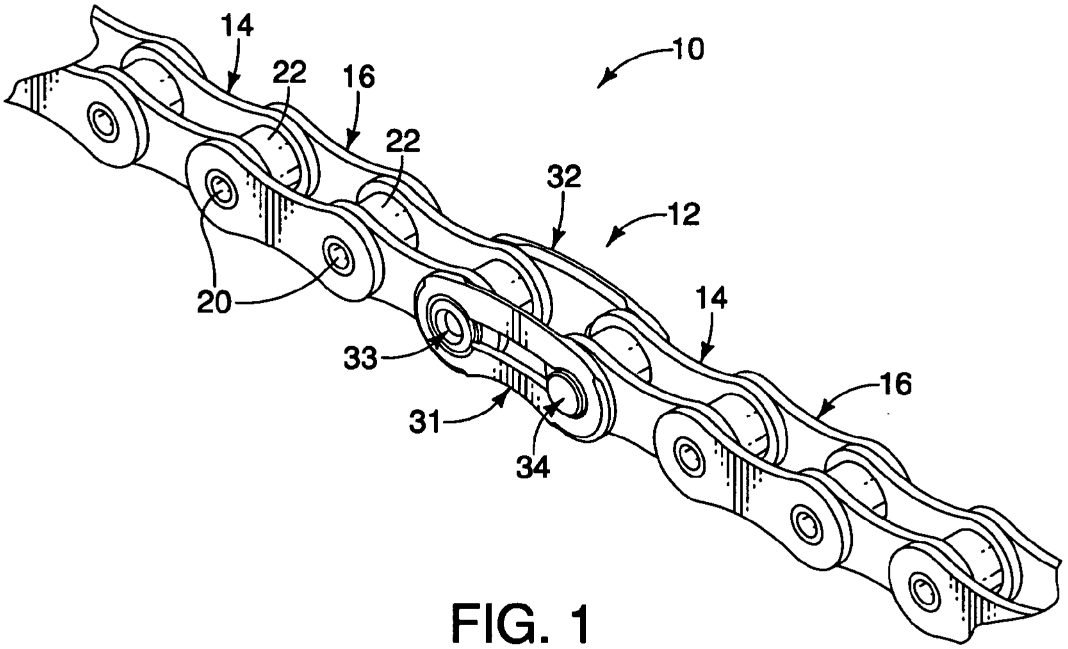
FIG. 1 is a perspective view of a bicycle chain equipped with a master chain link (bicycle chain connecting link) in accordance with a first embodiment of the present invention.
Figure 2:
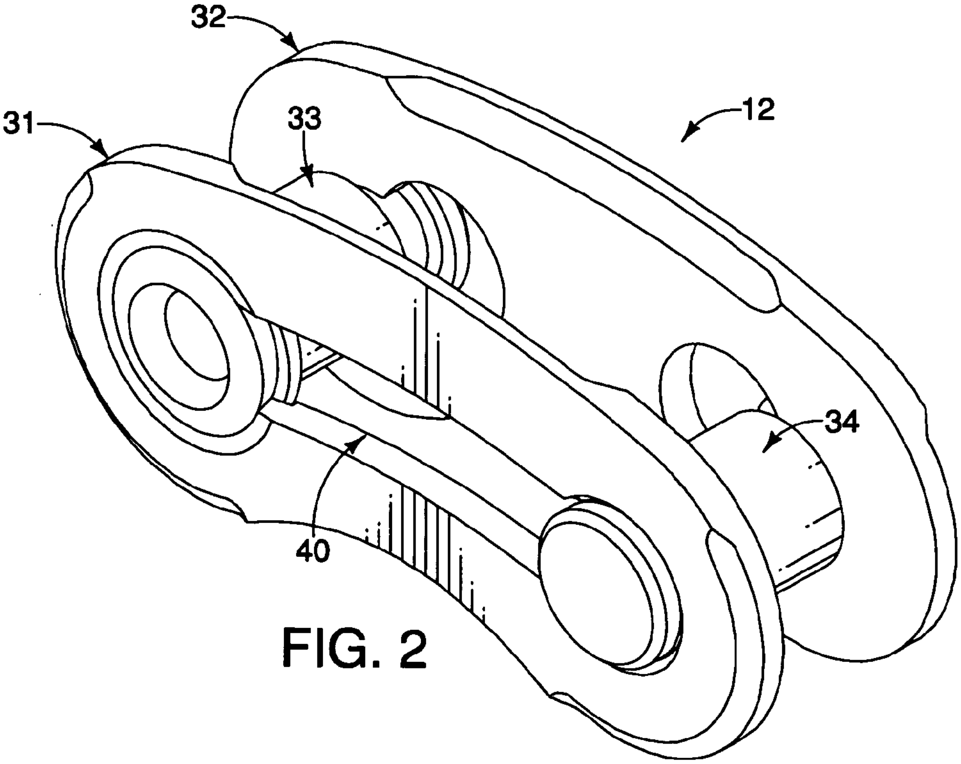
FIG. 2 is an enlarged perspective view of the bicycle chain connecting link illustrated in FIG. 1 in accordance with the first embodiment of the present invention.
Figure 3:
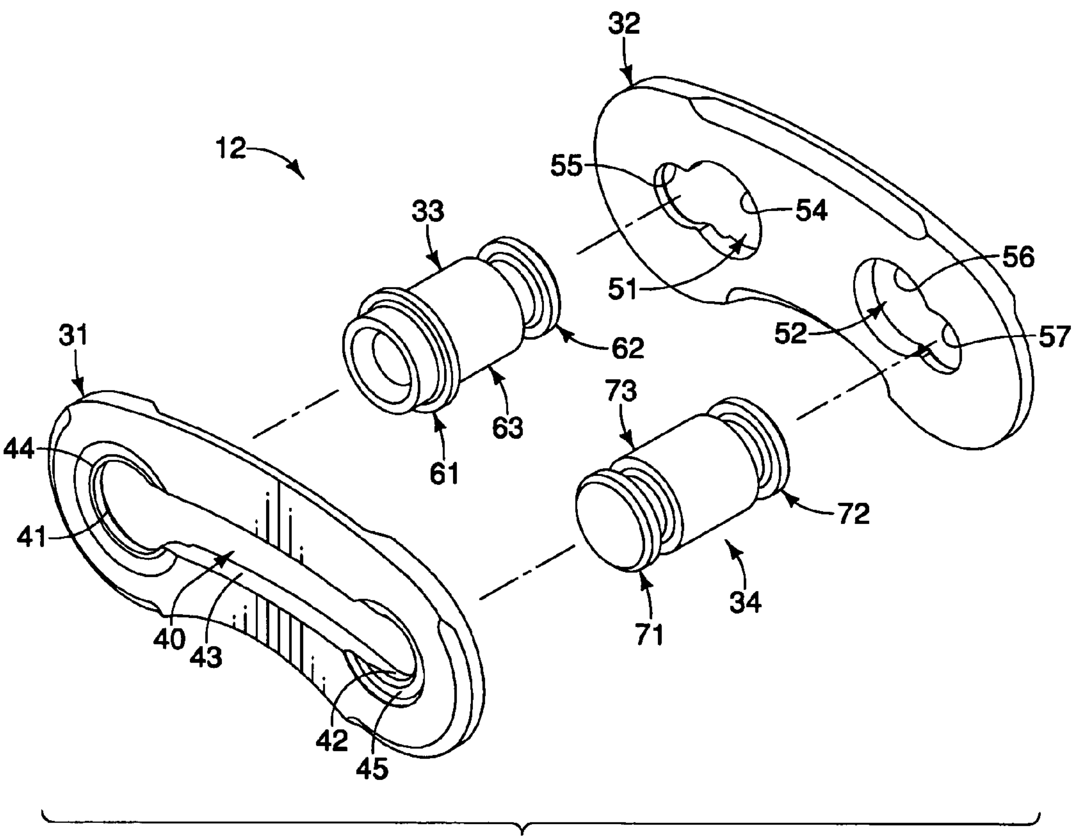
FIG. 3 is an enlarged, exploded perspective view of the bicycle chain connecting link illustrated in FIGS. 1 and 2 in accordance with the first embodiment of the present invention.
Figure 4:
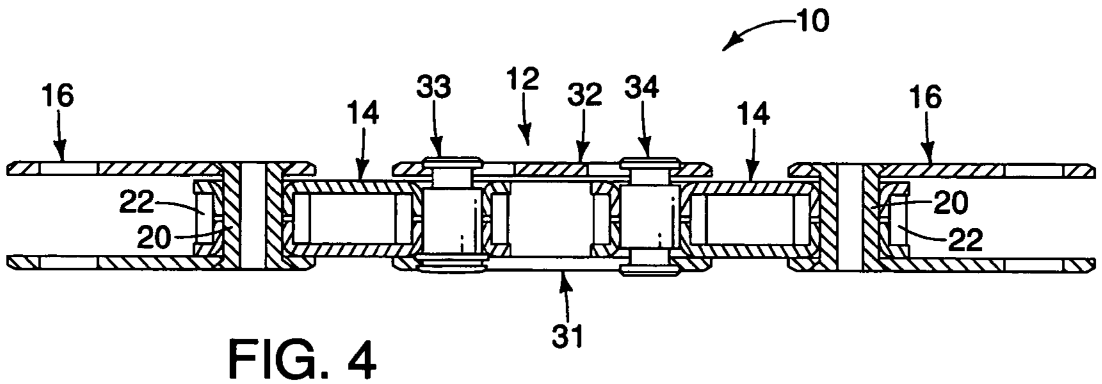
FIG. 4 is a longitudinal cross sectional view of the bicycle chain connecting link illustrated in FIGS. 1 to 4 in accordance with the first embodiment of the present invention.
Figure 5:
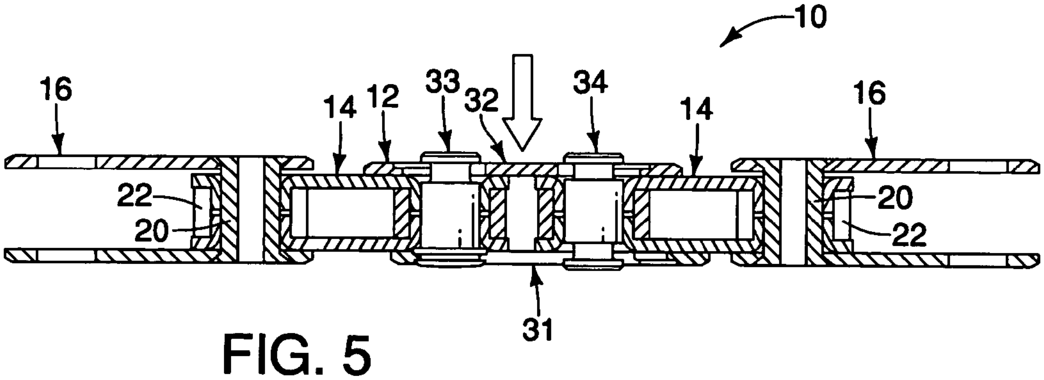
FIG. 5 is a longitudinal cross sectional view, similar to FIG. 4, of the bicycle chain connecting link illustrated in FIGS. 1 to 4, but with one of the link plates and one of the pins moved to disassemble positions in accordance with the first embodiment of the present invention.
Figure 6:
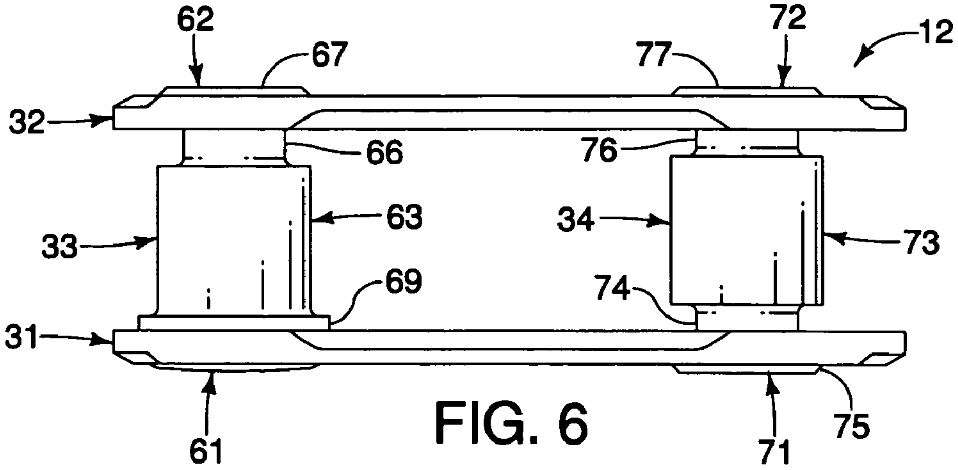
FIG. 6 is a top plan view of the bicycle chain connecting link illustrated in FIGS. 1 to 5 in accordance with the first embodiment of the present invention.
Figure 7:
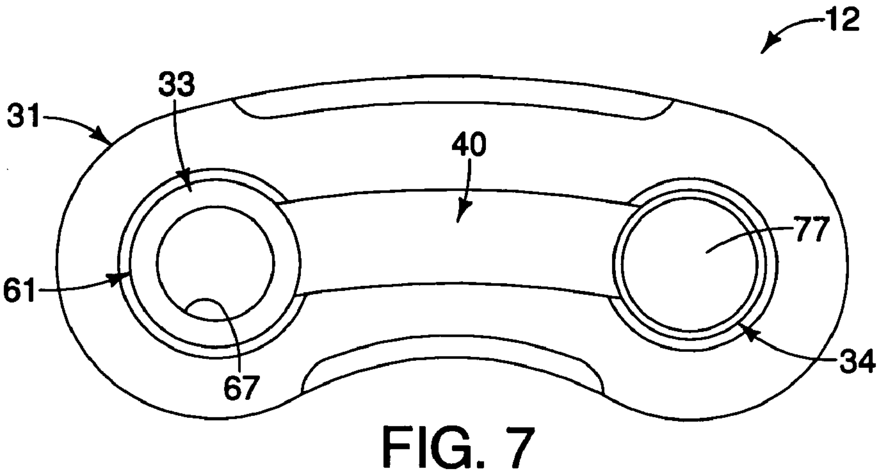
FIG. 7 is a side elevational view of the bicycle chain connecting link illustrated in FIGS. 1 to 6 in accordance with the first embodiment of the present invention.

Referring initially to FIGS. 1, 4 and 5, a bicycle chain 10 is illustrated that includes a bicycle master chain link 12 (a bicycle chain connecting link) in accordance with a preferred embodiment of the present invention. The bicycle chain 10 further includes a plurality of inner links 14, a plurality of outer links 16, a plurality of pins or rivets 20 and a plurality of rollers 22. The inner and outer links 14 and 16 are interconnected in an alternating manner by the pins 20 in a conventional manner. Basically, the master chain link 12 interconnects two of the inner links 14 that are located at the ends of the bicycle chain 10 so as to form a single continuous loop.

The inner and outer links 14 and 16, the pins 20 and the rollers 22 are metal parts that are well known in the bicycle chain field. Thus, the inner and outer links 14 and 16, the pins 20 and the rollers 22 will not be discussed and/or illustrated in detail herein. Moreover, these parts can vary as needed and/or desired. For example, while the pins 20 are illustrated as hollow cylinders that are deformed at each end, the pins 20 can be solid cylinders with a recess at each end so that the pins can be easily deformed.

Referring now to FIGS. 3 to 7, the bicycle chain connecting link 12 basically comprises a first link plate 31, a second link plate 32, a first link pin 33 and a second link pin 34. The first and second link plates 31 and 32 constitute outer links of the bicycle chain connecting link 12. The first and second link plates 31 and 32 and the first and second link pins 33 and 34 are each constructed of a rigid metallic material that is well known in the bicycle chain field. Basically, the first and second link pins 33 and 34 are retained on the first link plate 31 and detachably coupled to the second link plate 32 so that the inner links 14 that are located at the ends of the bicycle chain 10 can be easy installed on and removed from the first and second link pins 33 and 34 as explained below.

Referring now to FIGS. 10 to 14, the first link plate 31 is a flat metal plate that includes a longitudinal slot 40 with a first slot end 41, a second slot end 42 and a center connecting slot portion 43 extending between the first and second slot ends 41 and 42. The first slot end 41 has a wider transverse width than a transverse width of the connecting slot portion 43 of the longitudinal slot 40 and a transverse width of the second slot end 42 of the longitudinal slot 40, with these transverse widths being measured perpendicularly relative to a longitudinal axis of the first link plate 31.

The first link plate 31 further includes a pin deformation receiving depression 44 and a head receiving depression 45. The pin deformation receiving depression 44 partially surrounds the first slot end 41 of the longitudinal slot 40 in the first link plate 31. As explained below, the pin deformation receiving depression 44 is configured and arranged such that the first link pin 33 is deformed therein to fixedly retain the first link pin 33 within the longitudinal slot 40 at the first slot end 41. The head receiving depression 45 partially surrounds the second slot end 42 of the longitudinal slot 40 in the first link plate 31. As explained below, the head receiving depression 45 is configured and arranged such that the second link pin 34 is releasably retained within the longitudinal slot 40 at the second slot end 42 when the bicycle chain connecting link 12 is in an assembled state. As explained below, the second link pin 34 moves out of the head receiving depression 45 and then slides along the center connecting slot portion 43 towards the first slot end 41 when the second link plate 32 is being detached from the first and second link pins 33 and 34.

Referring now to FIGS. 15 to 18, the second link plate 32 is a flat metal plate that includes a first pin attachment opening 51 and a second pin attachment opening 52. The second pin attachment opening 52 is longitudinally spaced from the first pin attachment opening 51 along the second link plate 32. Basically, the first and second pin attachment openings 51 and 52 are identical, except for their orientation. In particular, the first pin attachment opening 51 has an enlarged pin connecting end 54 and a narrowed pin retaining end 55, while the second pin attachment opening 52 has an enlarged pin connecting end 56 and a narrowed pin retaining end 57. The enlarged pin connecting ends 54 and 56 of the first and second pin attachment openings 51 and 52 are arranged adjacent each other, while the narrowed pin retaining ends 55 and 57 of the first and second pin attachment openings 51 and 52 are arranged away from each other.

The enlarged pin connecting end 54 is dimensioned to removably receive the first link pin 33 therein, while the enlarged pin connecting end 56 is dimensioned to removably receive the second link pin 34 therein. In other words, the enlarged pin connecting ends 54 and 56 are configured and arranged such that the first and second link pins 33 and 34 can be inserted into the first and second pin attachment openings 51 and 52, respectively. The narrowed pin retaining end 55 is dimensioned to retain the first link pin 33 in the first pin attachment opening 51 when the bicycle chain connecting link 12 is in an assembled state. Likewise, the narrowed pin retaining end 57 is dimensioned to retain the second link pin 34 in the second pin attachment opening 52 when the bicycle chain connecting link 12 is in an assembled state.

The second link plate 32 further includes a first head receiving depression 58 and a second head receiving depression 59. The first head receiving depressions 58 partially surrounds the enlarged pin connecting end 54 of the first pin attachment openings 51, while the second head receiving depression 59 partially surrounds the enlarged pin connecting end 56 of the second pin attachment opening 52. The first and second head receiving depressions 58 and 59 are dimensioned to releasably retain the first and second link pins 33 and 34 when the bicycle chain connecting link 12 is in an assembled state.

Figure 8:
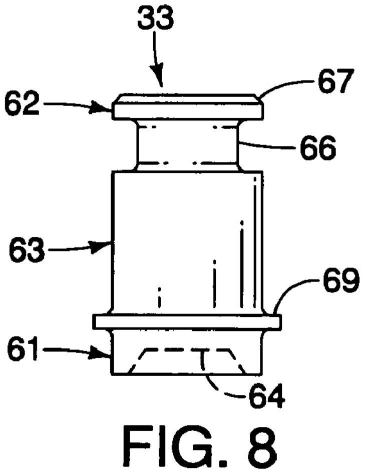
FIG. 8 is a top plan view of one of the pins of the bicycle chain connecting link illustrated in FIGS. 1 to 7 in accordance with the first embodiment of the present invention.

Referring now to FIG. 8, the first link pin 33 is a metal cylindrical member that includes a first pin end 61, a second pin end 62 and a center pin portion 63. The first pin end 61 is fixedly retained in the longitudinal slot 40 of the first link plate 31 at the first slot end 41. The second pin end 62 is releasably coupled in first pin attachment opening 51 of the second link plate 32 to be separated from the second link plate 32 and reattached to the second link plate 32 in a reusable manner.

Prior to installing the first link pin 33 to the first link plate 31, the first pin end 61 has a recess 64 such that the first pin end 61 is a cylindrical wall shape. This cylindrical wall is deformable to fix the first link pin 33 within the longitudinal slot 40 of the first link plate 31 at the first slot end 41. In particular, the cylindrical wall of the undeformed first link pin 33 is deformed into the pin deformation receiving depression 44 as a deformed portion such that the first pin end 61 of the first link pin 33 is permanently retained within the longitudinal slot 40 of the first link plate 31 at the first slot end 41 when the bicycle chain connecting link 12 is in an assembled state. In other words, the first pin end 61 of the first link pin 33 is deformed against the first link plate 31 at the first slot end 41 to fix the first pin end 61 against movement within the longitudinal slot 40 in the first link plate 31. The term "permanently" as used herein means that a part cannot be removed from another part without plastically deforming one of the parts.

The second pin end 62 of the first link pin 33 is configured to be attached to the second link plate 32 in a releasable manner without damage to the first link pin 33 or the second link plate 32. Thus, the second link plate 32 is reusably attached to second pin end 62 of the first link pin 33. The second pin end 62 of the first link pin 33 has a plate receiving recess 66 and a retaining head portion 67. The plate receiving recess 66 basically defines the retaining head portion 67 such that the retaining head portion 67 is disposed farther from the first pin end 61 of the first link pin 33 than the plate receiving recess 66. The plate receiving recess 66 is dimensioned to receive the second link plate 32 therein when the second pin end 62 of the first link pin 33 is inserted into the first pin attachment opening 51.

The plate receiving recess 66 of the second pin end 62 of the first link pin 33 is dimensioned relative to the second link plate 32 such that the second link plate 32 is axially movable along the second pin end 62 of the first link pin 33 while the second pin end 62 of the first link pin 33 is disposed in the first pin attachment opening 51 in the second link plate 32. In particular, the plate receiving recess 66 of the second pin end 62 of the first link pin 33 is further dimensioned to move between the enlarged pin connecting end 54 of the first pin attachment opening 51 and the narrowed pin retaining end 55 of the first pin attachment opening 51.

The retaining head portion 67 of the first link pin 33 is dimensioned smaller than the enlarged pin connecting end 54 of the first pin attachment opening 51 to be reinstallably removed therefrom. However, the retaining head portion 67 of the first link pin 33 is further dimension such that narrowed pin retaining end 55 of the first pin attachment opening 51 selectively retains the second pin end 62 of the first link pin 33 therein. Moreover, the first head receiving depression 58 of the second link plate 32 is dimensioned to selectively receive the retaining head portions of the retaining head portion 67 of the first link pin 33 when the bicycle chain connecting link 12 is in an assembled state. In other words, the first head receiving depression 58 of the second link plate 32 and the retaining head portion 67 of the first link pin 33 are dimensioned to prevent longitudinal movement of the first link pin 33 within the first pin attachment opening 51 in the second link plate 32 when the retaining head portion 67 of the first link pin 33 is disposed within the first head receiving depression 58 of the second link plate 32.

The center pin portion 63 is configured to support a pair of the inner links 14. The center pin portion 63 has a link abutment flange 69 that is disposed adjacent the first pin end 61 of the first link pin 33. Thus, the link abutment flange 69 is disposed between the first link plate 31 and one of the inner links 14 when the first link pin 33 is coupling to pair of the inner links 14 to the first and second plates 31 and 32.

Figure 9:
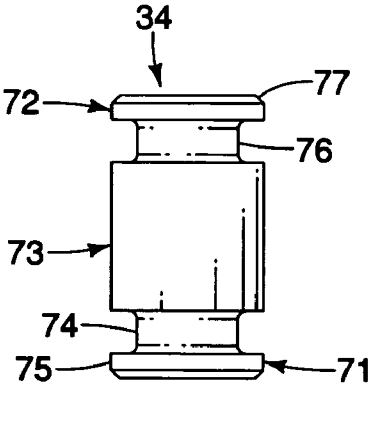
FIG. 9 is a top plan view of one of the pins of the bicycle chain connecting link illustrated in FIGS. 1 to 7 in accordance with the first embodiment of the present invention.
Figure 10:
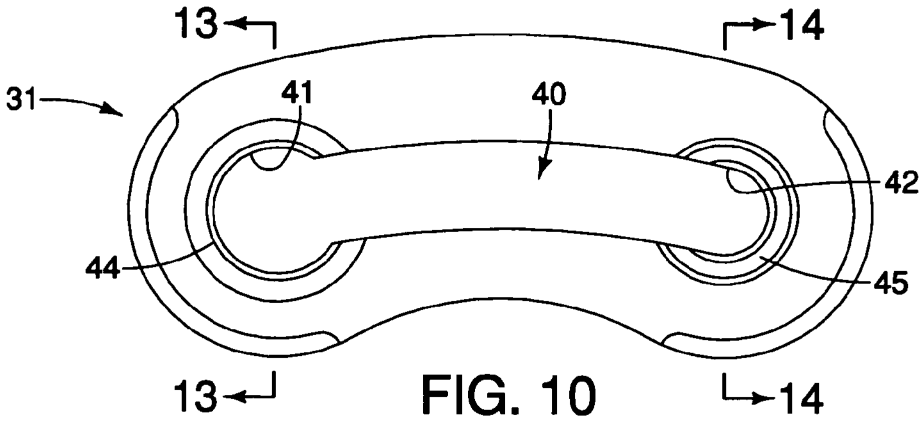
FIG. 10 is an outside elevational view of one of the link plates of the bicycle chain connecting link illustrated in FIGS. 1 to 7 in accordance with the first embodiment of the present invention.
Figure 11:
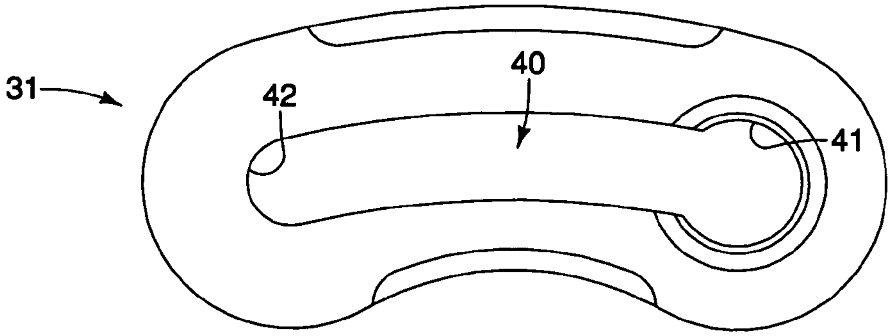
FIG. 11 is an inside elevational view of the link plate illustrated in FIG. 10 for the bicycle chain connecting link illustrated in FIGS. 1 to 7 in accordance with the first embodiment of the present invention.
Figure 12:
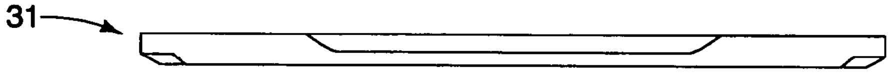
FIG. 12 is a top plan view of the link plate illustrated in FIGS. 10 and 11 for the bicycle chain connecting link illustrated in FIGS. 1 to 7 in accordance with the first embodiment of the present invention.
Figure 13:
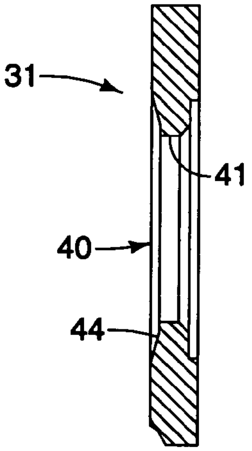
FIG. 13 is a cross sectional view of the link plate illustrated in FIGS. 10 to 12 as seen along section line 13-13 of FIG. 10 for the bicycle chain connecting link illustrated in FIGS. 1 to 7 in accordance with the first embodiment of the present invention.
Figure 14:
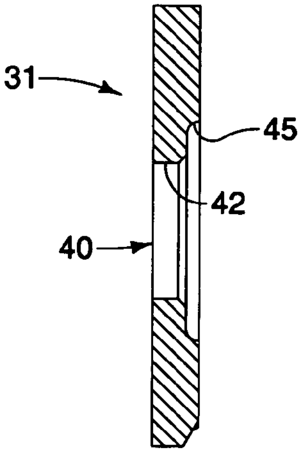
FIG. 14 is a cross sectional view of the link plate illustrated in FIGS. 10 to 13 as seen along section line 14-14 of FIG. 10 for the bicycle chain connecting link illustrated in FIGS. 1 to 7 in accordance with the first embodiment of the present invention.
Figure 15:
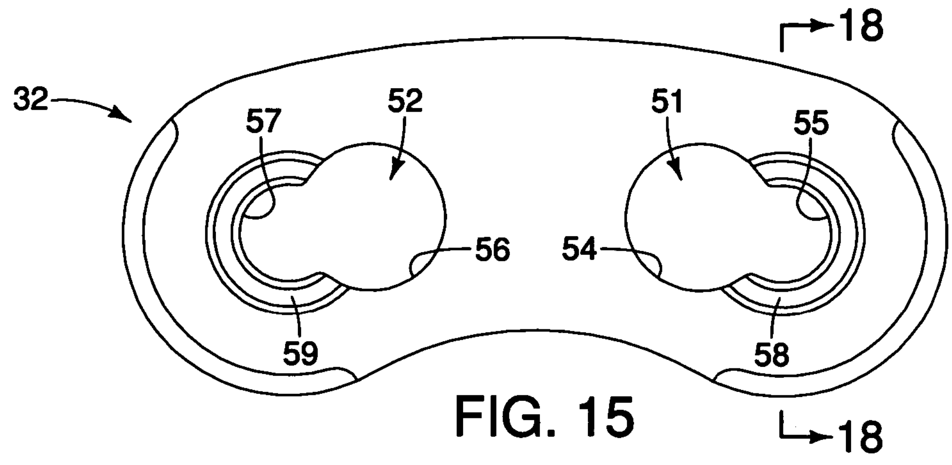
FIG. 15 is an outside elevational view of one of the link plates of the bicycle chain connecting link illustrated in FIGS. 1 to 7 in accordance with the first embodiment of the present invention.
Figure 16:
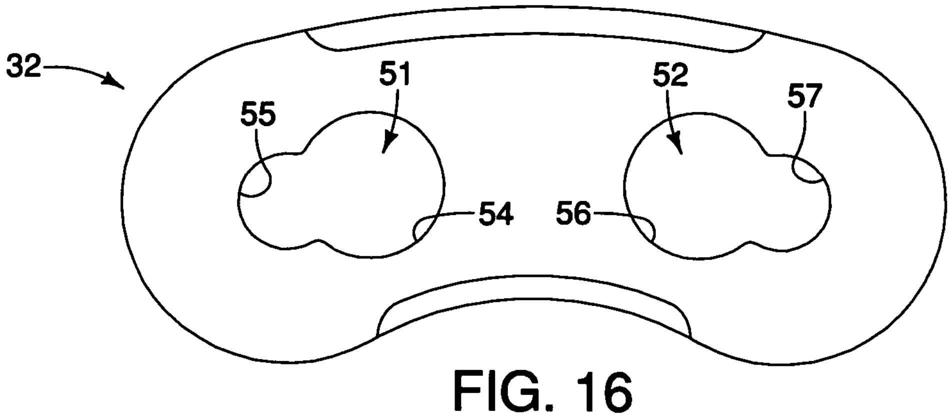
FIG. 16 is an inside elevational view of the link plate illustrated in FIG. 15 for the bicycle chain connecting link illustrated in FIGS. 1 to 7 in accordance with the first embodiment of the present invention.
Figure 17:
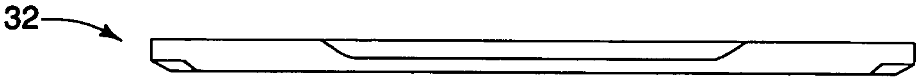
FIG. 17 is a top plan view of the link plate illustrated in FIGS. 15 and 16 for the bicycle chain connecting link illustrated in FIGS. 1 to 7 in accordance with the first embodiment of the present invention.
Figure 18:
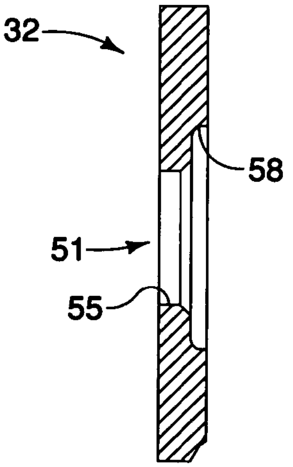
FIG. 18 is a cross sectional view of the link plate illustrated in FIGS. 15 to 17 as seen along section line 18-18 of FIG. 15 for the bicycle chain connecting link illustrated in FIGS. 1 to 7 in accordance with the first embodiment of the present invention.

Referring now to FIG. 9, the second link pin 34 is a metal cylindrical member that includes a first pin end 71, a second pin end 72 and a center portion 73. The first and second pin ends 71 and 72 are mirror images of each other and identical to the second pin end 62 of the first link pin 33. The first pin end 71 is slidably retained in the longitudinal slot 40 of the first link plate 31 to move longitudinally along the first link plate 31. The second pin end 72 is releasably coupled in the second pin attachment slot 52 of the second link plate 32 to be separated from the second link plate 32 and reattached to the second link plate 32 in a reusable manner.

The first pin end 71 of the second link pin 34 has a plate receiving recess 74 and a retaining head portion 75. The plate receiving recess 74 basically defines the retaining head portion 75 such that the retaining head portion 75 is disposed farther from the second pin end 72 of the second link pin 34 than the plate receiving recess 74. The plate receiving recess 74 is dimensioned to receive the first link plate 31 therein when the first pin end 71 of the second link pin 34 is inserted into the first slot end 41 of the longitudinal slot 40 in the first link plate 31. Thus, the retaining head portion 75 has a transverse width that is dimensioned to be inserted into the first slot end 41 of the longitudinal slot 40 in the first link plate 31 and retained in the second slot end 42 and the center connecting slot portion 43 of the longitudinal slot 40 in the first link plate 31. When the first link pin 33 is fixed within the first slot end 41 of the longitudinal slot 40, the second link pin 34 is slidably retained within the longitudinal slot 40 of the first link plate 31. In other words, the first pin end 71 of the second link pin 34 is configured to be attached to the first link plate 31 so as to slide within the longitudinal slot 40 of the first link plate 31. The head receiving depression 45 of the first link plate 31 and the retaining head portion 75 of the second link pin 34 are dimensioned to prevent longitudinal movement of the second link pin 34 within the longitudinal slot 40 in the first link plate 31 when the retaining head portion 75 of the second link pin 34 is disposed within the head receiving depression 45 of the first link plate 31.

The second pin end 72 of the second link pin 34 has a plate receiving recess 76 and a retaining head portion 77. The plate receiving recess 76 basically defines the retaining head portion 77 such that the retaining head portion 77 is disposed farther from the first pin end 71 of the second link pin 34 than the plate receiving recess 76. The plate receiving recess 76 is dimensioned to receive the second link plate 32 therein when the second pin end 72 of the second link pin 34 is inserted into the enlarged pin connecting end 56 of the second pin attachment opening 52 in the second link plate 32. Thus, the retaining head portion 77 has a transverse width that is dimensioned to be inserted into the enlarged pin connecting end 56 of the second pin attachment opening 52 in the second link plate 32 and retained in the narrowed pin retaining end 57 of the second pin attachment opening 52 in the second link plate 32. In other words, the second pin end 72 of the second link pin 34 is configured to be attached to the second link plate 32 so as to slide within the second pin attachment opening 52 in the second link plate 32. The second head receiving depression 59 of the second link plate 32 and the retaining head portion 77 of the second link pin 34 are dimensioned to prevent longitudinal movement of the second link pin 34 within the second pin attachment opening 52 in the second link plate 32 when the retaining head portion 77 of the second link pin 34 is disposed within the second head receiving depression 59 of the second link plate 32.

Figure 19:
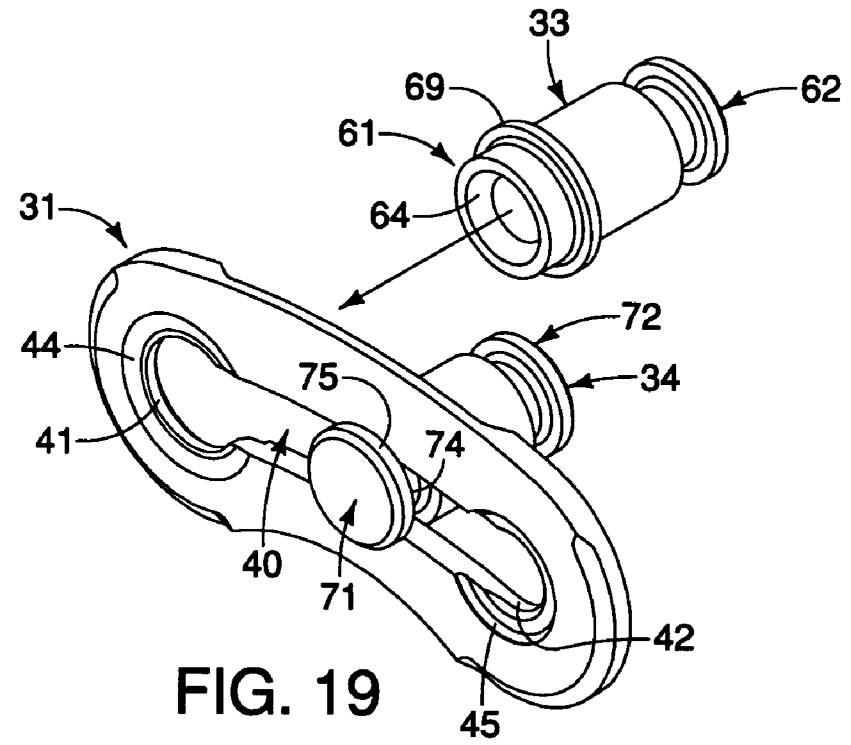
FIG. 19 is an exploded perspective view of selected parts of the bicycle chain connecting link illustrated in FIGS. 1 to 7 showing an initial assemble step in accordance with the first embodiment of the present invention.
Figure 20:
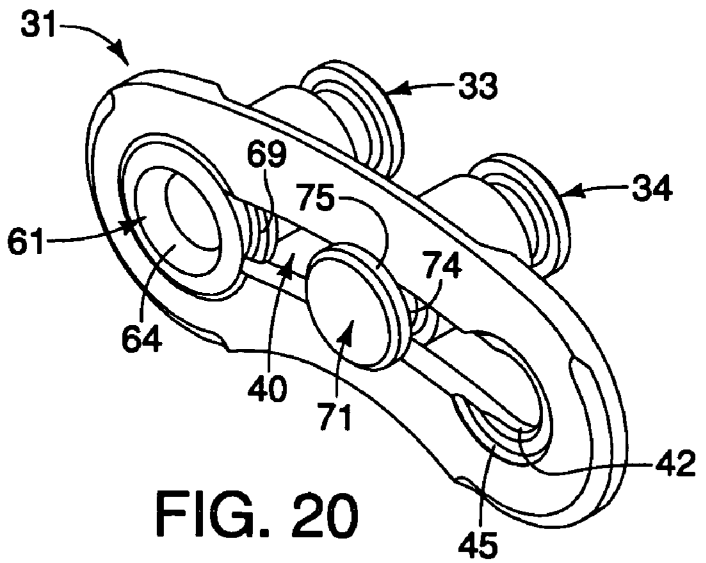
FIG. 20 is a perspective view of selected parts of the bicycle chain connecting link illustrated in FIGS. 1 to 7 showing a subsequent assemble step from the step shown in FIG. 19 in accordance with the first embodiment of the present invention.
Figure 21:
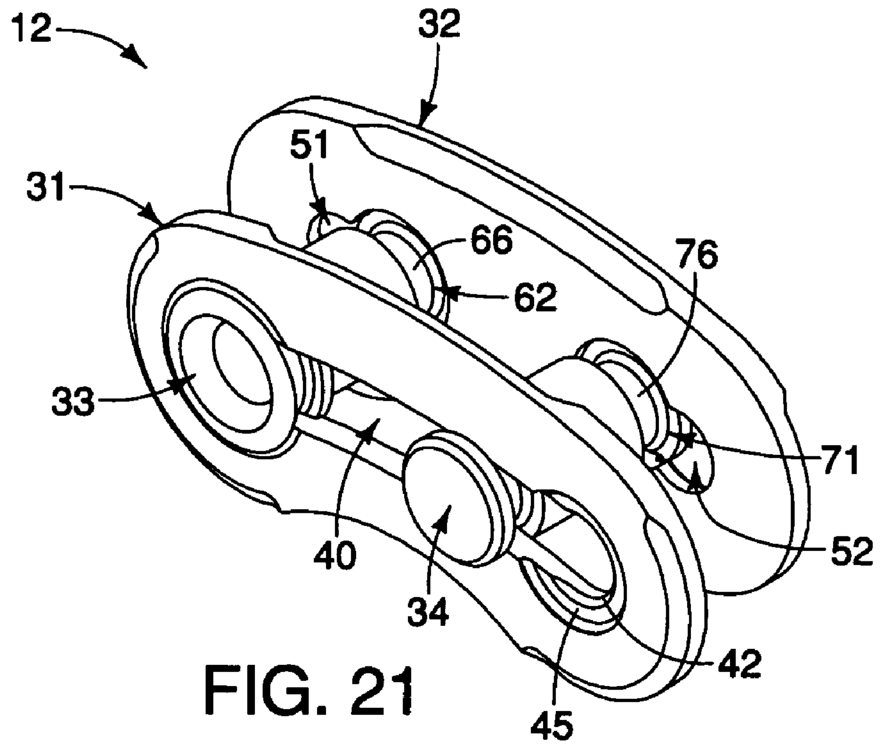
FIG. 21 is a perspective view of the bicycle chain connecting link illustrated in FIGS. 1 to 7 showing a subsequent assemble step from the step shown in FIG. 20 in accordance with the first embodiment of the present invention.
Figure 22:
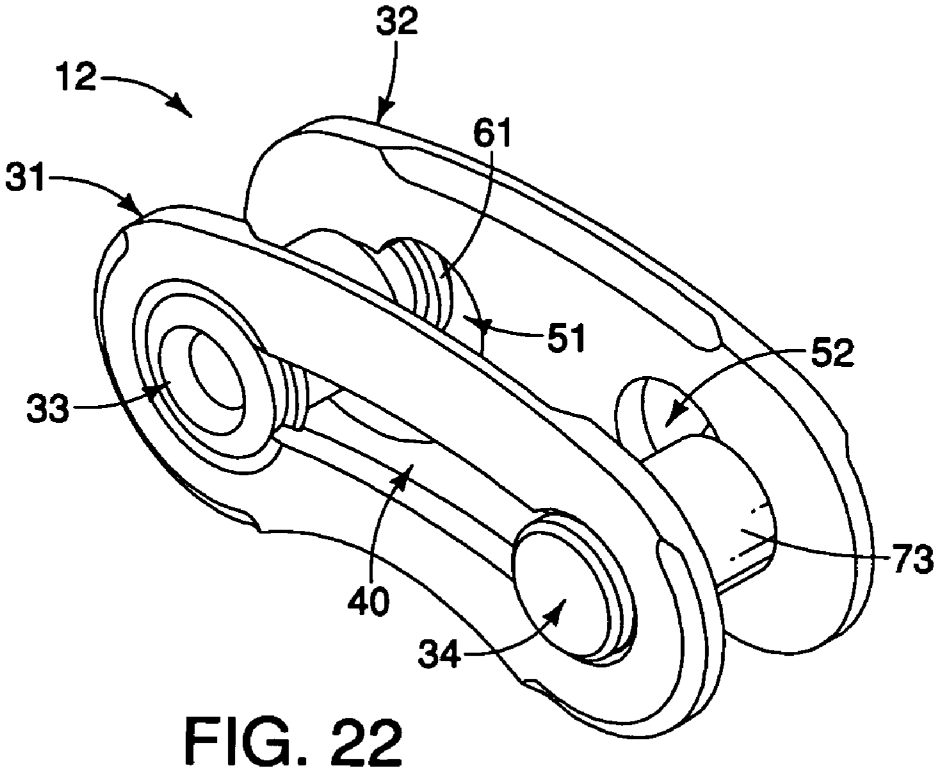
FIG. 22 is a perspective view of the bicycle chain connecting link illustrated in FIGS. 1 to 7 showing a final assemble step in accordance with the first embodiment of the present invention.

Now the overall assembly of the bicycle chain connecting link 12 will be discussed with reference to FIGS. 19 to 22. As seen in FIGS. 19 and 20, the first and second link plates 31 and 32 are first coupled to the first link plate 31 using the first slot end 41. In particular, the first pin end 71 of the second link pin 34 is inserted into the longitudinal slot 40 in the first link plate 31 via the enlarged slot portion of the first slot end 41 such that the first link plate 31 is located in the plate receiving recess 74 of the first pin end 71 of the second link pin 34. Now, the second link pin 34 is moved along the center connecting slot portion 43 to the second slot end 42. Due to the size of the retaining head portion 75 of the second link pin 34 relative to the transverse widths of the center connecting slot portion 43 and the second slot end 42, the second link pin 34 is retained on the first link plate 31 within the longitudinal slot 40.

Next, the first link pin 33 is permanently fixed to the first link plate 31 by a riveting process. In particular, the cylindrical wall of the undeformed first link pin 33 is deformed into the pin deformation receiving depression 44 as a deformed portion such that the first pin end 61 of the first link pin 33 is permanently retained within the longitudinal slot 40 of the first link plate 31 at the first slot end 41 when the bicycle chain connecting link 12 is in an assembled state. In other words, the first pin end 61 of the first link pin 33 is deformed against the first link plate 31 at the first slot end 41 to fix the first pin end 61 against movement within the longitudinal slot 40 in the first link plate 31.

Finally, the second link plate 32 is installed on the second pin ends 62 and 72 of the first and second pins 33 and 34. This is done by first inserting the second pin ends 62 and 72 of the first and second pins 33 and 34 into the enlarged pin connecting ends 54 and 56 of the first and second pin attachment openings 51 and 52 in the second link plate 32. Once the second pin ends 62 and 72 of the first and second link pins 33 and 34 are disposed in the enlarged pin connecting ends 54 and 56 of the first and second pin attachment openings 51 and 52, the second link plate 32 and the second link pin 34 such that the second pin ends 62 and 72 of the first and second link pins 33 and 34 are disposed in the narrowed pin retaining ends 55 and 57 of the first and second pin attachment openings 51 and 52. Then the retaining head portions 67 and 77 are moved into the first and second head receiving depressions 58 and 59 by moving the second link plate 32 away from the first link plate 31. The first and second head receiving depressions 58 and 59 are dimensioned to prevent movement of the retaining head portions 67 and 77 of the first and second link pins 33 and 34 from the narrowed pin retaining ends 55 and 57 of the first and second pin attachment openings 51 and 52 to the enlarged pin connecting ends 54 and 56 of the first and second pin attachment openings 51 and 52 when the bicycle chain connecting link 12 is in an assembled state.

Figure 23:
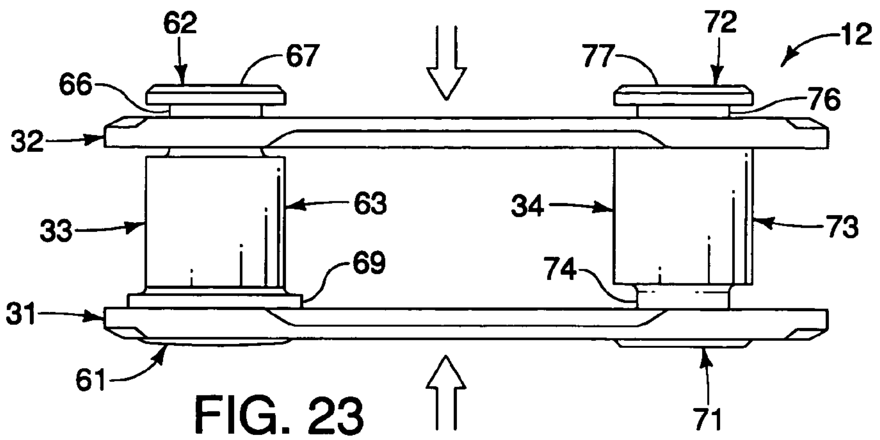
FIG. 23 is a top plan view of the bicycle chain connecting link illustrated in FIGS. 1 to 7 showing an initial disassemble step in accordance with the first embodiment of the present invention.
Figure 24:
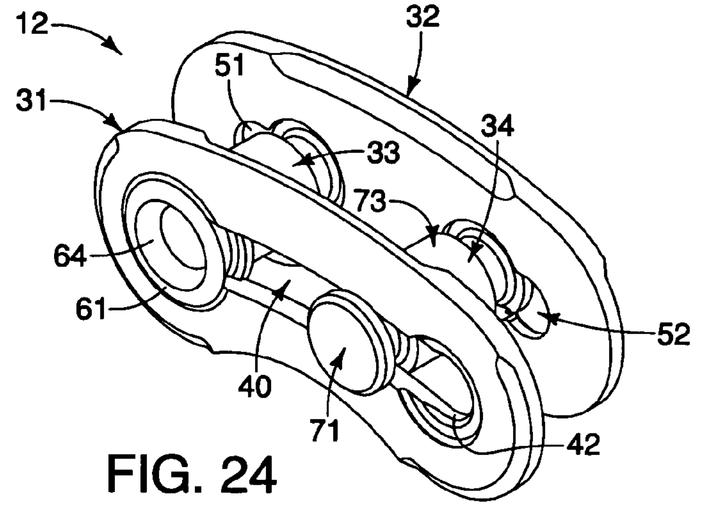
FIG. 24 is a perspective view of the bicycle chain connecting link illustrated in FIGS. 1 to 7 showing a subsequent disassemble step from the step shown in FIG. 23 in accordance with the first embodiment of the present invention.
Figure 25:
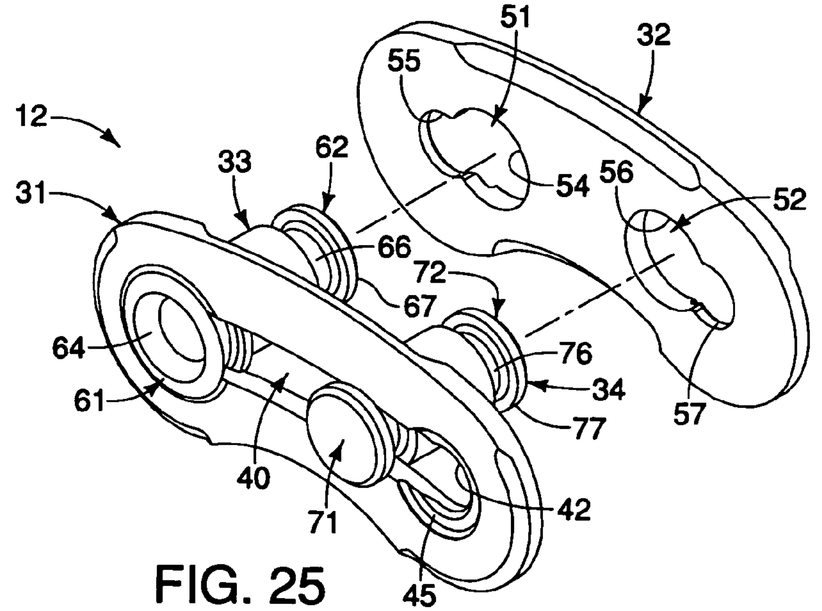
FIG. 25 is a perspective view of the bicycle chain connecting link illustrated in FIGS. 1 to 7 showing a subsequent disassemble step from the step shown in FIG. 24 in accordance with the first embodiment of the present invention.
Figure 26:
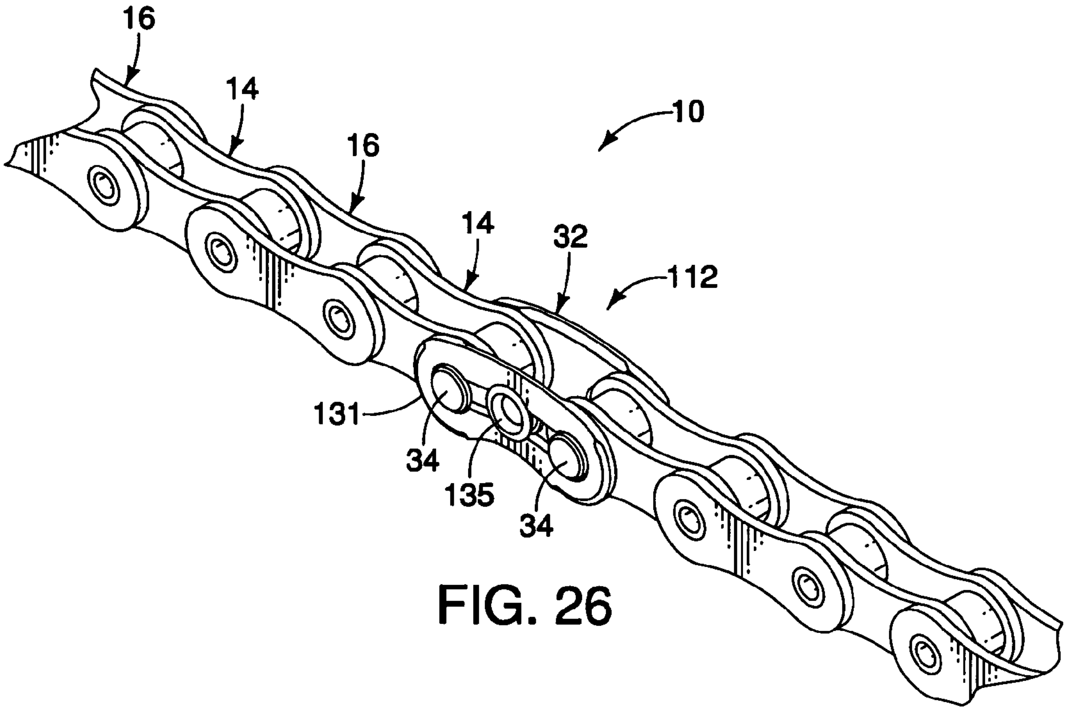
FIG. 26 is a perspective view of a bicycle chain equipped with a master chain link (bicycle chain connecting link) in accordance with a second embodiment of the present invention.
Figure 27:
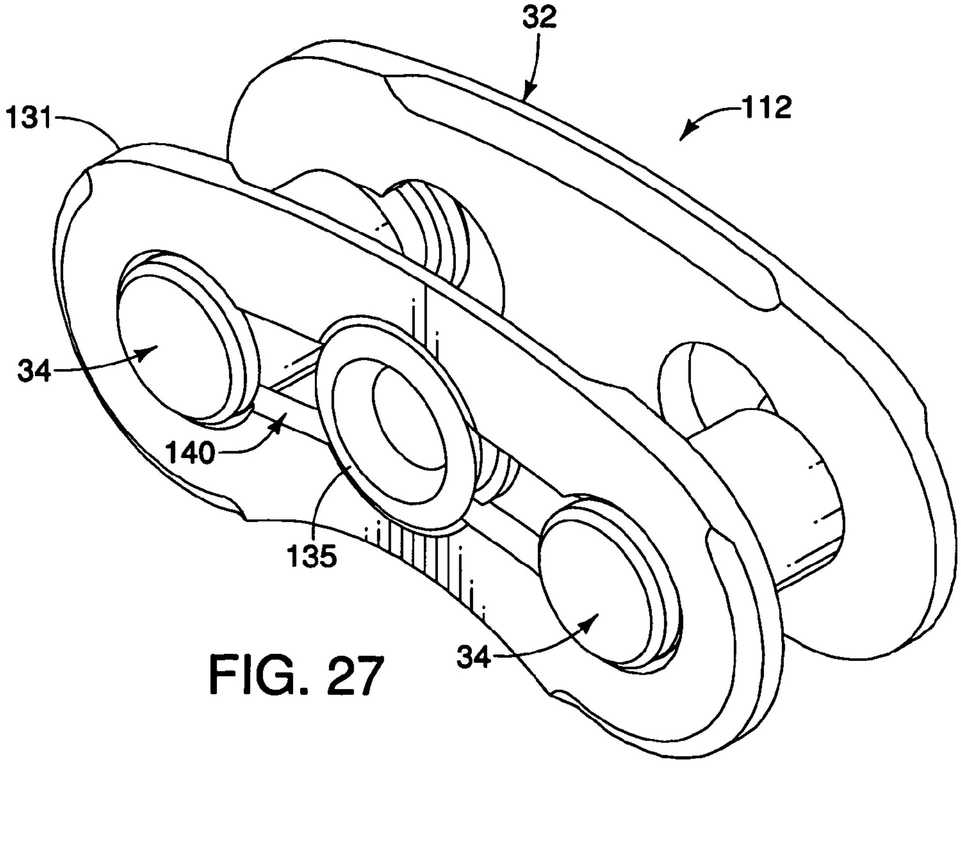
FIG. 27 is an enlarged perspective view of the bicycle chain connecting link illustrated in FIG. 26 in accordance with the second embodiment of the present invention.
Figure 28:
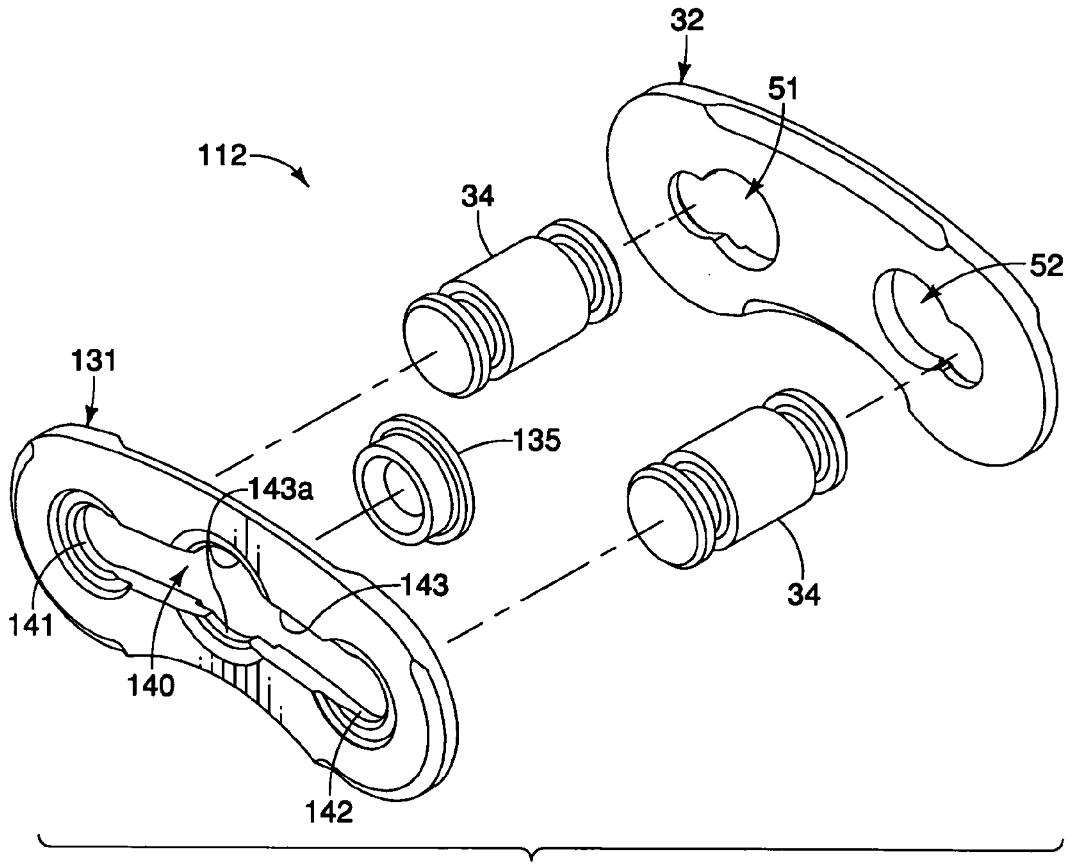
FIG. 28 is an enlarged, exploded perspective view of the bicycle chain connecting link illustrated in FIGS. 26 and 27 in accordance with the second embodiment of the present invention.
Figure 29:
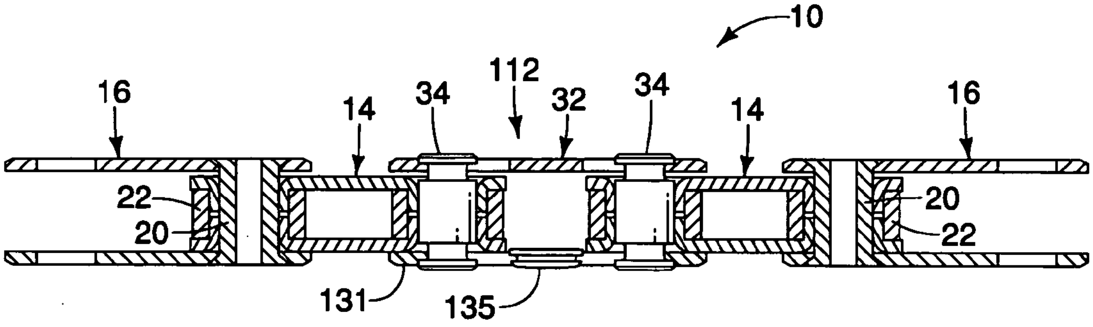
FIG. 29 is a longitudinal cross sectional view of the bicycle chain connecting link illustrated in FIGS. 26 to 29 in accordance with the second embodiment of the present invention.
Figure 30:
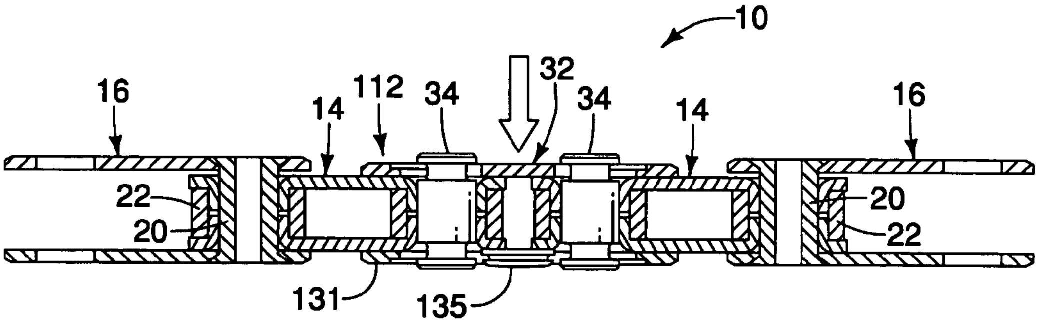
FIG. 30 is a longitudinal cross sectional view, similar to FIG. 29, of the bicycle chain connecting link illustrated in FIGS. 26 to 29, but with one of the link plates and the pins moved to disassemble positions in accordance with the second embodiment of the present invention.
Figure 31:
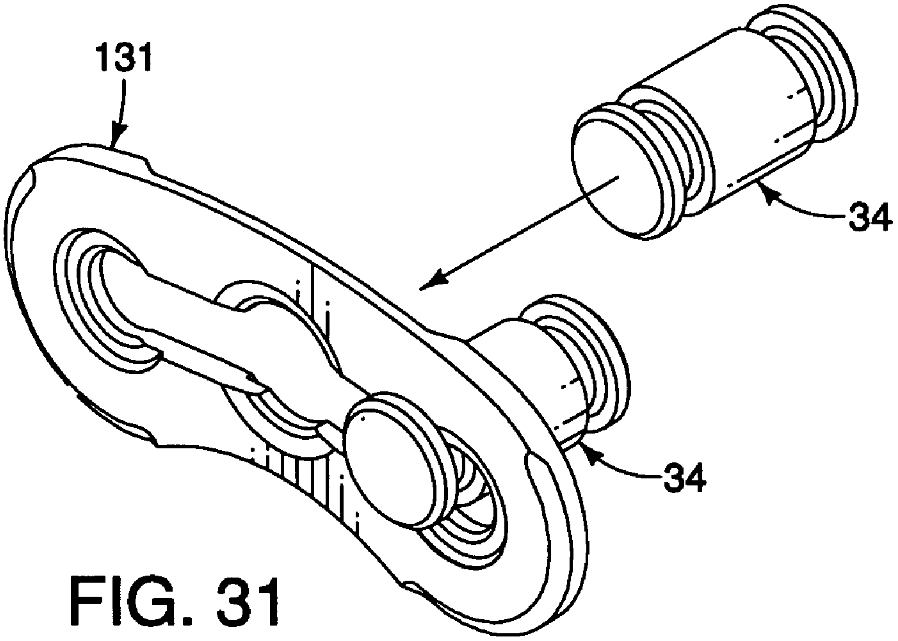
FIG. 31 is a perspective view of selected parts of the bicycle chain connecting link illustrated in FIGS. 26 to 30 showing assemble of the pins to the link plate in accordance with the second embodiment of the present invention.
Figure 32:
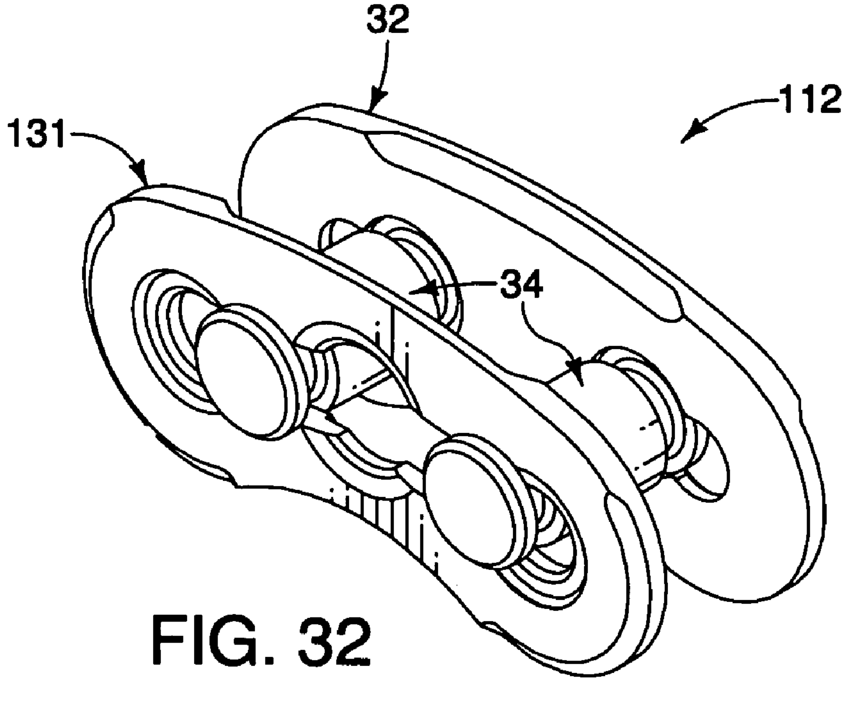
FIG. 32 is a perspective view of the bicycle chain connecting link illustrated in FIGS. 26 to 30 showing a subsequent assemble step from the step shown in FIG. 31 in accordance with the second embodiment of the present invention.
Figure 33:
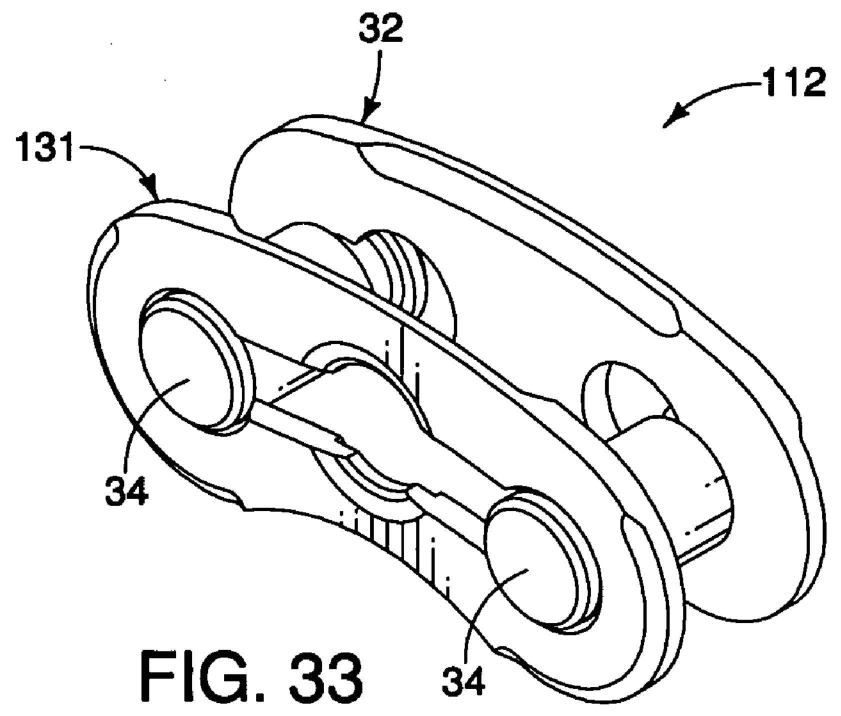
FIG. 33 is a perspective view of the bicycle chain connecting link illustrated in FIGS. 26 to 30 showing a subsequent assemble step from the step shown in FIG. 32 in accordance with the second embodiment of the present invention.
Figure 34:
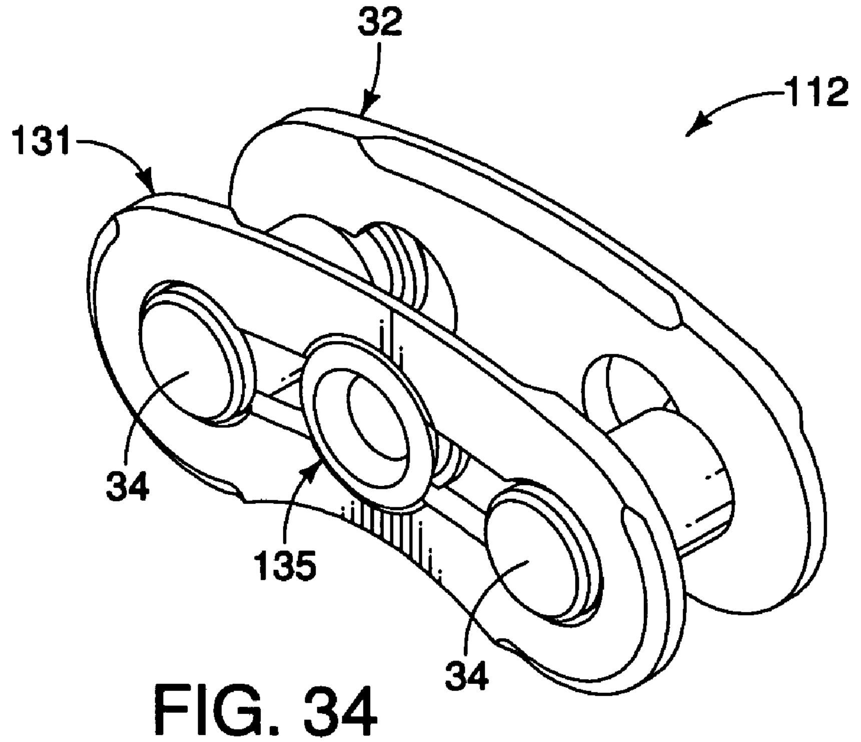
FIG. 34 is a perspective view of the bicycle chain connecting link illustrated in FIGS. 26 to 30 showing a final assemble step in accordance with the second embodiment of the present invention.

To disassemble or detach the second link plate 32 from the second pin ends 62 and 72 of the first and second link pins 33 and 34, the second link plate 32 is first moved towards the first link plate 31, as seen in FIG. 23. Thus, the retaining head portions 67 and 77 of the first and second link pins 33 and 34 of the first and second link pins 33 and 34 move out of the head receiving depressions 58 and 59 of the second link plate 32. Also the retaining head portion 75 of the second link pin 34 is moved out of the head receiving depressions 45 of the first link plate 31. In this position, the second link pin 34 can be move towards the first link pin 33 within the longitudinal slot 40 of the first link plate 31 and the second link plate 32 can be moved relative the second pin ends 62 and 72 of the first and second link pins 33 and 34 such that the retaining head portions 67 and 77 of the first and second link pins 33 and 34 are located in the enlarged pin connecting ends 54 and 56 of the first and second pin attachment openings 51 and 52. Now, the second link plate 32 can be detached from the first and second link pins 33 and 34.

Second Embodiment

Referring now to FIGS. 26 to 34, a bicycle chain connecting link 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will now be described.

The bicycle chain connecting link 112 basically comprises a first link plate 131, the second link plate 32 from the first embodiment, a pair of the link pins 34 from the first embodiment and a rivet 135. Basically, the link pins 34 are retained on the first link plate 131 and detachably coupled to the second link plate 32 so that the inner links 14 that are located at the ends of the bicycle chain 10 can be easy installed on and removed from the link pins 34. Thus, only the first link plate 131 and the rivet 135 are different from the first embodiment.

The first link plate 131 is a flat metal plate that includes a longitudinal slot 140 with a first slot end 141, a second slot end 142 and a center connecting slot portion 143 extending between the first and second slot ends 141 and 142. The center connecting slot portion 143 has a pair of notches 143*a* for installing the link pins 34 into the longitudinal slot 140 of the first link plate 131. The first and second slot ends 141 and 142 are mirror images of each other, and are configured in the same manner as the second slot end 41 of the first link plate 31 of the first embodiment. Thus, the first and second slot ends 141 and 142 have the same transverse widths as the transverse width of the connecting slot portion 143 of the longitudinal slot 140, except at the notches 143*a* where the transverse width of the longitudinal slot 140 increases so that the link pins 34 can be installed. The rivet 135 is fixedly retained in the longitudinal slot 140 of the first link plate 131 at the notches 143*a* to retain the link pins 34 within the longitudinal slot 140 of the first link plate 131.

Third Embodiment

Figure 35:
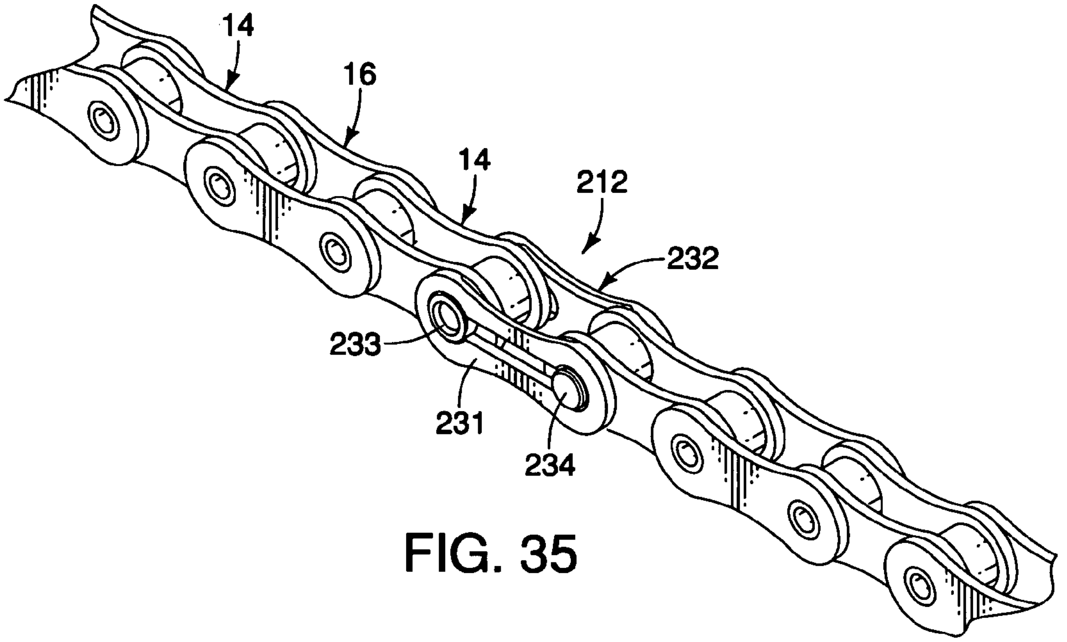
FIG. 35 is a perspective view of a bicycle chain equipped with a master chain link (bicycle chain connecting link) in accordance with a third embodiment of the present invention.
Figure 36:
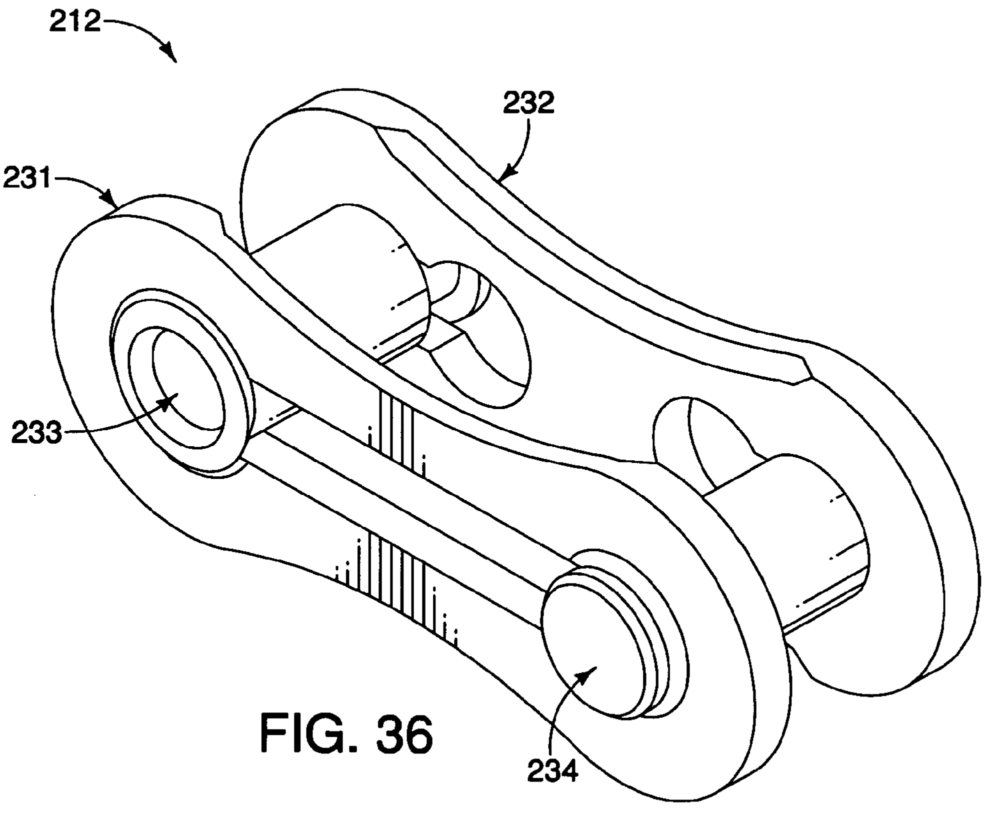
FIG. 36 is an enlarged perspective view of the bicycle chain connecting link illustrated in FIG. 25 in accordance with the third embodiment of the present invention.
Figure 37:
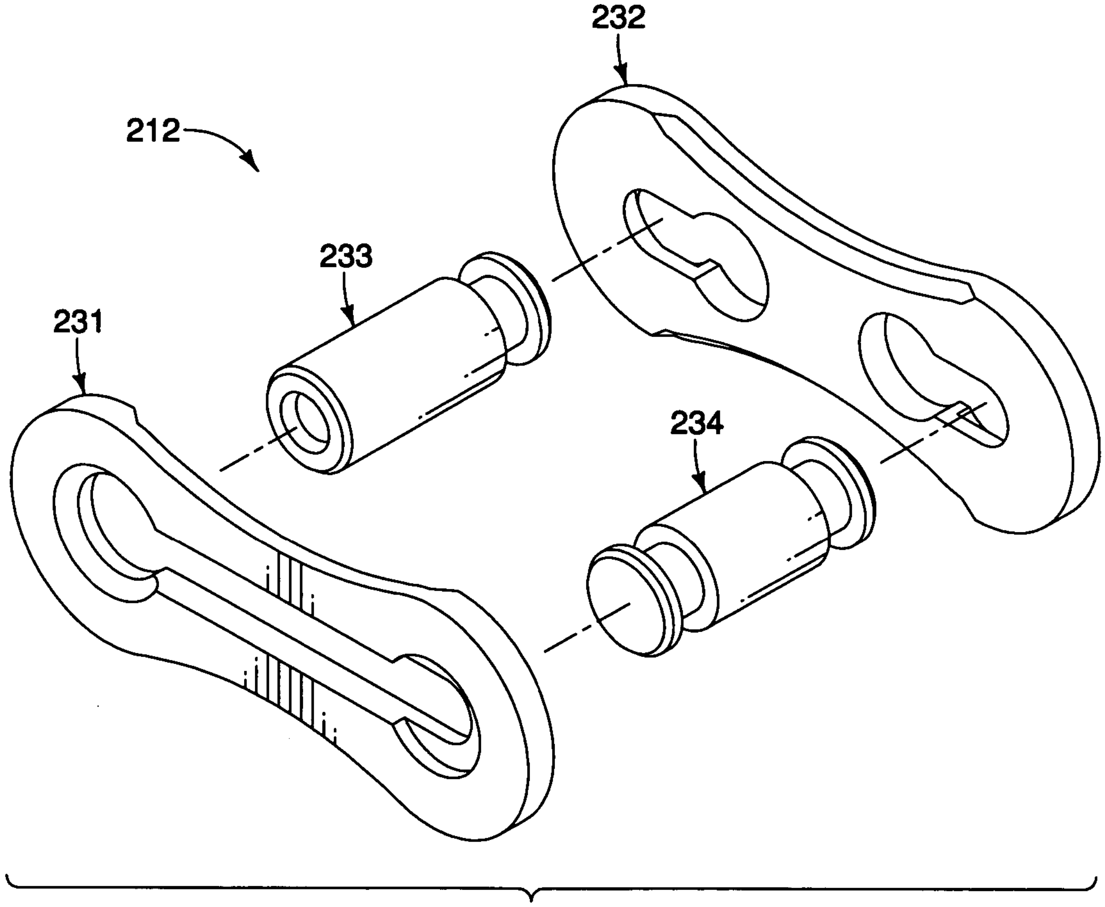
FIG. 37 is an enlarged, exploded perspective view of the bicycle chain connecting link illustrated in FIGS. 35 and 36 in accordance with the third embodiment of the present invention.

Referring now to FIGS. 35 to 37, a bicycle chain connecting link 212 in accordance with a third embodiment will now be explained. The bicycle chain connecting link 212 basically comprises a first link plate 231, a second link plate 232, a first link pin 233 and a second link pin 234. In view of the similarity between the first and third embodiments, the third embodiment will not be discussed in detail herein. Moreover, the descriptions of the parts of the third embodiment that correspond to the parts of the first embodiment are the same and thus, these descriptions of the parts of the third embodiment have been omitted for the sake of brevity.

Basically, the only differences between the first and third embodiments in the shapes of the link plates and the shapes of link pins have been modified to look more like a conventional link. The assembly of the bicycle chain connecting link 212 is the same as the assembly of the bicycle chain connecting link 12 discussed above. Likewise, the second link plate 232 is detachable from the free ends of the first and second link pins 233 and 234 in the same manner as the bicycle chain connecting link 12 discussed above.

GENERAL INTERPRETATION OF TERMS

In understanding the scope of the present invention, the term “configured” as used herein to describe a component, section or part of a device includes hardware and/or software that is constructed and/or programmed to carry out the desired function. In understanding the scope of the present invention, the term “comprising” and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, “including”, “having” and their derivatives. Also, the terms “part,” “section,” “portion,” “member” or “element” when used in the singular can have the dual meaning of a single part or a plurality of parts. As used herein to describe the present invention, the following directional terms “forward, rearward, above, downward, vertical, horizontal, below and transverse” as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as “substantially”, “about” and “approximately” as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle chain connecting link comprising:

a first link plate including a longitudinal slot;

a second link plate including a first pin attachment opening and a second pin attachment opening;

a first link pin including a first pin end retained to the first link plate and a second pin end releasably coupled in the first pin attachment opening of the second link plate to be separated from the second link plate and reattached to the second link plate; and a second link pin including a first pin end retained in the longitudinal slot of the first link plate and a second pin end releasably coupled in the second pin attachment opening of the second link plate to be separated from the second link plate and reattached to the second link plate, at least one of the first pin ends of the first and second link pins being slidable within the longitudinal slot of the first link plate in a longitudinal direction of the longitudinal slot of the first link plate.

2. The bicycle chain connecting link according to claim 1, wherein one of the first pin ends of the first and second link pins is fixed against longitudinal movement within the longitudinal slot of the first link plate.

3. The bicycle chain connecting link according to claim 1, wherein both of the first pin ends of the first and second link pins are slidable within the longitudinal slot of the first link plate in the longitudinal direction of the longitudinal slot of the first link plate.

4. The bicycle chain connecting link according to claim 1, wherein each of the first and second pin attachment openings in the second link plate has an enlarged pin connecting end and a narrowed pin retaining end, with the enlarged pin connecting ends being dimensioned to insert the second pin ends of the first and second link pins therein, and the narrowed pin retaining ends being dimensioned to selectively retain the second pin ends of the first and second link pins.

5. The bicycle chain connecting link according to claim 4, wherein the enlarged pin connecting ends of the first and second pin attachment openings in the second link plate are arranged adjacent each other, and the narrowed pin retaining ends of the first and second pin attachment openings in the second link plate are arranged away from each other.

6. The bicycle chain connecting link according to claim 4, wherein each of the second pin ends of the first and second link pins has a plate receiving recess and a retaining head portion disposed farther from the first pin ends of the first and second link pins, respectively, than the plate receiving recess, the plate receiving recesses of the first and second link pins being dimensioned to move between the enlarged pin connecting ends of the first and second pin attachment openings and the narrowed pin retaining ends of the first and second pin attachment openings, respectively, and the retaining head portions of the first and second link pins being dimensioned smaller than the enlarged pin connecting ends of the first and second pin attachment openings to be reinstallably removed, and the narrowed pin retaining ends being dimensioned to selectively retain the second pin ends of the first and second link pins.

7. The bicycle chain connecting link according to claim 6, wherein the plate receiving recesses of the second pin ends of the first and second link pins are dimensioned relative to the second link plate such that the second link plate is axially movable along the first and second link pins while the second pin ends of the first and second link pins are disposed in the narrowed pin retaining ends of the first and second pin attachment openings in the second link plate.

8. The bicycle chain connecting link according to claim 6, wherein the second link plate further includes first and second head receiving depressions partially surrounding the enlarged pin connecting ends of the first and second pin attachment openings, respectively, that are dimensioned to selectively receive the retaining head portions of the first and second link pins when in an assembled state.

9. The bicycle chain connecting link according to claim 7, wherein the second link plate further includes first and second head receiving depressions partially surrounding the enlarged pin connecting ends of the first and second pin attachment openings, respectively, that are dimensioned to selectively receive the retaining head portions of the first and second link pins when in an assembled state.

10. The bicycle chain connecting link according to claim 1, wherein the first pin end of the first link pin is deformed against the first link plate at a first slot end to fix the first pin end of the first link pin against movement within the longitudinal slot in the first link plate.

11. The bicycle chain connecting link according to claim 10, wherein the first link plate further includes a pin deformation receiving depression partially surrounding the first slot end of the longitudinal slot in the first link plate with a deformed portion of the first pin end of the first link pin being disposed therein.

12. The bicycle chain connecting link according to claim 10, wherein each of the first and second pin attachment openings in the second link plate has an enlarged pin connecting end and a narrowed pin retaining end, with the enlarged pin connecting ends being dimensioned to insert the second pin ends of the first and second link pins therein, and the narrowed pin retaining ends being dimensioned to selectively retain the second pin ends of the first and second link pins.

13. The bicycle chain connecting link according to claim 12, wherein the enlarged pin connecting ends of the first and second pin attachment openings in the second link plate are arranged adjacent each other, and the narrowed pin retaining ends of the first and second pin attachment openings in the second link plate are arranged away from each other.

14. The bicycle chain connecting link according to claim 13, wherein each of the second pin ends of the first and second link pins has a plate receiving recess and a retaining head portion disposed farther from the first pin ends of the first and second link pins, respectively, than the plate receiving recess, the plate receiving recesses of the first and second link pins being dimensioned to move between the enlarged pin connecting ends of the first and second pin attachment openings and the narrowed pin retaining ends of the first and second pin attachment openings, respectively, and the retaining head portions of the first and second link pins being dimensioned smaller than the enlarged pin connecting ends of the first and second pin attachment openings to be reinstallably removed, and the narrowed pin retaining ends being dimensioned to selectively retain the second pin ends of the first and second link pins.

15. The bicycle chain connecting link according to claim 1, wherein the first pin end of the second link pin has a plate receiving recess and a retaining head portion disposed farther from the second pin end of the second link pin than the plate receiving recess, with the plate receiving recess of the second link pin having the first link plate disposed therein.

16. The bicycle chain connecting link according to claim 15, wherein the first link plate further includes a head receiving depression partially surrounding one slot end of the longitudinal slot in the first link plate with the retaining head portion of the first pin end of the second link pin being dimensioned to be disposed therein when in an assembled state.

17. The bicycle chain connecting link according to claim 15, wherein each of the first and second pin attachment openings in the second link plate has an enlarged pin connecting end and a narrowed pin retaining end, with the enlarged pin connecting ends being dimensioned to insert the second pin ends of the first and second link pins therein, and the narrowed pin retaining ends being dimensioned to selectively retain the second pin ends of the first and second link pins.

18. The bicycle chain connecting link according to claim 17, wherein the enlarged pin connecting ends of the first and second pin attachment openings in the second link plate are arranged adjacent each other, and the narrowed pin retaining ends of the first and second pin attachment openings in the second link plate are arranged away from each other.

19. The bicycle chain connecting link according to claim 17, wherein each of the second pin ends of the first and second link pins has a plate receiving recess and a retaining head portion disposed farther from the first pin ends of the first and second link pins, respectively, than the plate receiving recess, the plate receiving recesses of the first and second link pins being dimensioned to move between the enlarged pin connecting ends of the first and second pin attachment openings and the narrowed pin retaining ends of the first and second pin attachment openings, respectively, and the retaining head portions of the first and second link pins being dimensioned smaller than the enlarged pin connecting ends of the first and second pin attachment openings to be reinstallably removed, and the narrowed pin retaining ends being dimensioned to selectively retain the second pin ends of the first and second link pins.

20. The bicycle chain connecting link according to claim 1, wherein the longitudinal slot in the first link plate has at least a first area of the longitudinal slot in the first link plate with a wide first transverse width that is dimensioned for inserting the first pin ends of the first and second link pins therein during assembly of the bicycle chain connecting link and at least a second area of the longitudinal slot in the first link plate with a narrow second transverse width that is dimensioned for retaining the first pin ends of the first and second link pins therein after assembly of the bicycle chain connecting link.

21. The bicycle chain connecting link according to claim 20, wherein each of the first and second pin attachment openings in the second link plate has an enlarged pin connecting end and a narrowed pin retaining end, with the enlarged pin connecting ends being dimensioned to insert the second pin ends of the first and second link pins therein, and the narrowed pin retaining ends being dimensioned to selectively retain the second pin ends of the first and second link pins.

22. The bicycle chain connecting link according to claim 21, wherein the enlarged pin connecting ends of the first and second pin attachment openings in the second link plate are arranged adjacent each other, and the narrowed pin retaining ends of the first and second pin attachment openings in the second link plate are arranged away from each other.

* * * * *